U S 0 0 7 1 0 6 0 3 1 B 2

United States Patent
Hayakawa et al.

(10) Patent No.: US 7,106,031 B2
(45) Date of Patent: Sep. 12, 2006

(54) ELECTRIC POWER SUPPLY APPARATUS HAVING INPUT SWITCHING CIRCUIT

(75) Inventors: Junji Hayakawa, Okazaki (JP); Hiroyuki Ban, Hazu-gun (JP); Jyunichi Nagata, Nukata-gun (JP)

(73) Assignee: Denso Corporation, Kariya (JP)

( * ) Notice: Subject to any disclaimer, the term of this patent is extended or adjusted under 35 U.S.C. 154(b) by 24 days.

(21) Appl. No.: 11/053,919

(22) Filed: Feb. 10, 2005

(65) Prior Publication Data
US 2005/0206323 A1   Sep. 22, 2005

(30) Foreign Application Priority Data
Mar. 19, 2004   (JP)   ............................. 2004-081311

(51) Int. Cl.
*G05F 1/613* (2006.01)
*G05F 1/40* (2006.01)
(52) U.S. Cl. ..................... 323/224; 323/238; 323/285
(58) Field of Classification Search ................ 323/222, 323/224, 225, 238, 246, 259, 284, 285, 290, 323/901; 361/93.1, 93.8
See application file for complete search history.

(56) References Cited

U.S. PATENT DOCUMENTS

| 4,814,685 | A | * | 3/1989 | Renger ........................ 323/224 |
| 6,166,527 | A | * | 12/2000 | Dwelley et al. ............ 323/222 |
| 6,259,234 | B1 | * | 7/2001 | Perol ........................... 323/222 |
| 6,509,721 | B1 | * | 1/2003 | Liebler ........................ 323/224 |

FOREIGN PATENT DOCUMENTS

JP     A-6-335238     12/1994

* cited by examiner

*Primary Examiner*—Jessica Han
(74) *Attorney, Agent, or Firm*—Posz Law Group, PLC (57) ABSTRACT

In a power supply apparatus, a switching circuit selectively applies one of an input voltage of a power converting circuit and an output voltage of the power converting circuit to a voltage reducing power supply circuit. When the input voltage is applied to the power converting circuit, the switching circuit selects this input voltage, so that the output voltage of the voltage reducing power supply circuit can quickly rise. Thereafter, when the output voltage of the power converting circuit exceeds this output voltage, the switching circuit selects the output voltage of the power converting circuit. As a result, a difference between the input voltage and the output voltage of the voltage reducing power supply circuit is decreased. Thus, a power loss is lowered and noise produced in the power converting circuit is suppressed.

10 Claims, 4 Drawing Sheets

ELECTRIC POWER SUPPLY APPARATUS HAVING INPUT SWITCHING CIRCUIT

CROSS REFERENCE TO RELATED APPLICATION

This application is based on and incorporates herein by reference Japanese Patent Application No. 2004-81311 filed on Mar. 19, 2004.

FIELD OF THE INVENTION

The present invention generally relates to an electric power supply apparatus equipped with a switching power supply circuit (switching regulator) and a voltage reducing power supply circuit (series regulator). More specifically, the present invention is directed to such a switching/series-regulator power supply apparatus capable of quickly raising an output voltage.

BACKGROUND OF THE INVENTION

A voltage reducing power supply circuit (series regulator) detects its output voltage, and compares the detected voltage with a predetermined reference voltage. In response to a voltage comparison result, the voltage reducing power supply circuit controls a conduction condition under ON state of a control transistor, namely controls a voltage between the collector and the emitter of the control transistor.

Specifically, when the detected voltage is higher than the reference voltage, the voltage reducing power supply circuit increases the collector-emitter voltage. Conversely, when the detected voltage is lower than the reference voltage, the voltage reducing power supply circuit decreases the collector-emitter voltage. As a result, while the output voltage can be stabilized, the voltage reducing power supply circuit can produce the target output voltage from the input voltage in high precision.

However, in the voltage reducing power supply circuit, the input voltage is reduced to produce the output voltage. Therefore, a relatively large power loss may necessarily occur. The larger a difference between the input voltage and the output voltage becomes, the larger the power loss is increased.

On the other hand, a switching power supply circuit (switching regulator) is also known as a power supply circuit capable of reducing a power loss. In this switching regulator circuit, an input voltage is interrupted by turning on and off a switching device. Then, the interrupted input voltage is smoothed by using a coil and a capacitor. Since the switching power supply circuit adjusts the output voltage by turning on and off the switching device, the power loss can be reduced.

However, in the switching power supply circuit, noise such as ripple voltages may be produced in connection with on and off operations of the switching device.

As a consequence, as disclosed in, for instance, JP-A-6-335238, a switching power supply circuit is connected in series with a voltage reducing power supply circuit. In accordance with this conventional electric power supply apparatus, after the input voltage has been previously reduced by the switching power supply circuit, the reduced input voltage is applied to the voltage reducing power supply circuit. As a result, lowering of the power loss can be improved. Further, since the noise caused by the switching power supply circuit is smoothed by the voltage reducing power supply circuit, the suppression of the noise can be improved.

When an input voltage applied to the switching power supply circuit rises, the switching power supply circuit may rapidly raise an output voltage thereof. In this case, a very large current may flow into a smoothing circuit constructed with a coil and a capacitor due to the raised output voltage, as compared with the current of the steady state. In particular, the coil provided in the smoothing circuit is stressed by the large current. As a result, reliability may be lowered.

To avoid this stress, a soft starting circuit or the like is provided in a switching power supply circuit so that, when an input voltage is applied to the switching power supply circuit, an output voltage thereof may gradually rise. This soft starting circuit is effectively operated in, for example, a circuit for producing a pulse signal which drives a switching device to generate such a pulse signal, the pulse width of which is gradually prolonged.

As described above, when the soft starting circuit is provided in the switching power supply circuit, the improvement in the reliability may be conspicuously achieved. However, a delay time will occur until the output voltage rises and then becomes stable. As a consequence, in the case that the switching power supply circuit is connected in series with the voltage reducing power supply circuit, a delay time may be produced when the output voltage of the voltage reducing power supply circuit rises, which is mainly caused by, especially, a rising delay of the output voltage in the switching power supply circuit. As a result, when a load circuit connected to the conventional power supply apparatus is initiated, a very long time duration may be required until the load circuit is activated, depending upon a magnitude of a required load activating current.

SUMMARY OF THE INVENTION

The present invention has therefore an object to provide an electric power supply apparatus capable of realizing a sudden rising operation of an output voltage, while reducing a power loss and suppressing noise.

In a power supply apparatus according to the present invention, a switching circuit is provided to selectively supply an input terminal of the switching power supply circuit with either an input voltage applied to the input terminal of the switching power supply circuit or an output voltage outputted from an output terminal of the switching power supply circuit. When the supply of the input voltage to the switching power supply circuit is commenced, this switching circuit supplies the input voltage applied to the switching power supply circuit to the input terminal of the voltage reducing power supply circuit. Since the input voltage to the switching power supply circuit is directly applied to the input terminal of the voltage reducing power supply circuit without via the switching power supply circuit, the output voltage of the voltage reducing power supply circuit can quickly rise.

Thereafter, in the case that a predetermined condition is established, the switching circuit switches the input voltage applied to the voltage reducing power supply circuit to the output voltage outputted from the switching power supply circuit. As a result, the difference between the input voltage and the output voltage of the voltage reducing power supply circuit is decreased. Thus, the power loss which may occur in the voltage reducing power supply circuit can be reduced, and also the noise produced in the switching power supply circuit can be suppressed.

BRIEF DESCRIPTION OF THE DRAWINGS

For a better understanding of the present invention, reference is made to a detailed description to be read in conjunction with the accompanying diagrams, in which.

DETAILED DESCRIPTION OF THE PREFERRED EMBODIMENT

First Embodiment

Figure 1:
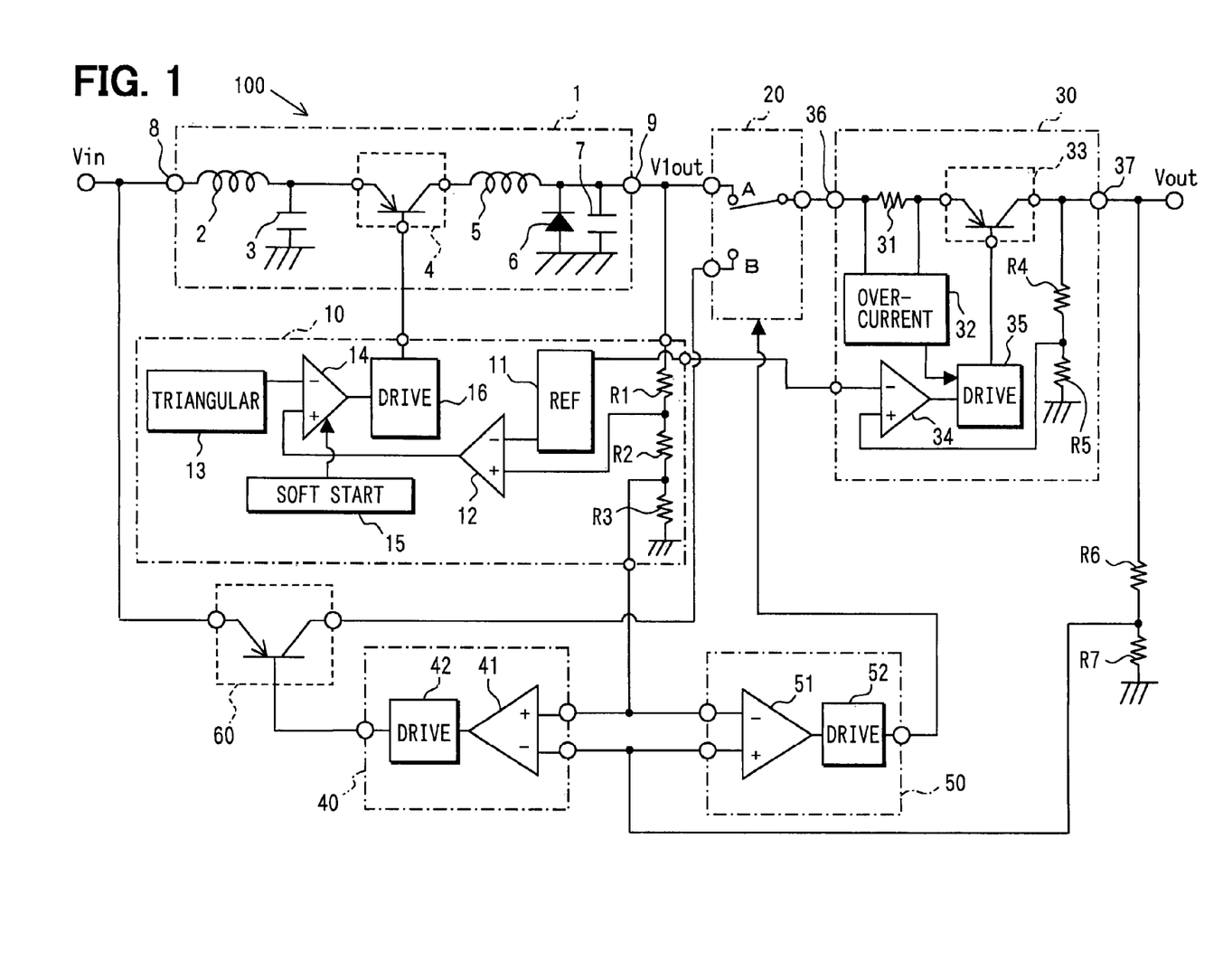
FIG. 1 is a circuit diagram showing an electric power supply apparatus according to a first embodiment of the present invention.

Referring first to FIG. 1, an electric power supply apparatus 100 has a power converting circuit functioning as a switching power supply circuit (switching regulator). An input-side smoothing circuit is constructed with a coil 2 and a capacitor 3, which are connected to an input terminal 8 of the power converting circuit 1. This input-side smoothing circuit is provided to reduce a variation of an input voltage Vin when the input voltage applied to the input terminal 8 of the power converting circuit 1 is varied.

A switching device 4 made of a PNP transistor is connected to an output of the smoothing circuit. This switching device 4 is turned on and off in response to a drive pulse signal which is supplied from a switching control circuit 10.

To smooth a voltage which is intermittently outputted from the switching device 4, an output-side smoothing circuit which is constructed with a coil 5 and a capacitor 7 is connected to the switching device 4. Furthermore, a flywheel diode 6 is connected in parallel with the capacitor 7 of the output-side smoothing circuit. This flywheel diode 6 absorbs counter-electromotive force which is produced in the coil 5 when switching device 4 is turned on and off. The voltage which is smoothed by the output-side smoothing circuit is outputted as an output voltage V1out of the power converting circuit 1 from an output terminal 9.

The output voltage of the power converting circuit 1 is inputted to the switching control circuit 10. The switching control circuit 10 is provided with a series resistor circuit and a reference power supply circuit 11. The series resistor circuit is constructed with resistors R1, R2 and R3. The series resistor circuit detects an output voltage of the power converting circuit 1 by dividing this output voltage. The reference power supply circuit 11 generates a reference voltage which constitutes a reference of the output voltage of the power converting circuit 1.

Both the reference voltage generated by the reference power supply circuit 11 and the detection voltage detected by the series resistor circuit are applied to an error amplifier 12. The error amplifier 12 amplifies a difference between the applied reference voltage and the detection voltage, and outputs the amplified difference voltage.

The switching control circuit 10 further has a PWM (Pulse Width Modulation) circuit 14. The PWM circuit produces a drive pulse signal which is used to turn on and off the switching device 4. Both the amplified output voltage from the error amplifier 12 and a triangular wave signal produced by a triangular wave oscillating circuit 13 are applied to this PWM circuit 14.

The PWM circuit 14 compares the amplified output voltage of the error amplifier 12 with the triangular wave produced from the triangular wave oscillating circuit 13. It produces a signal having a "Lo" level for a time period during which the triangular wave exceeds the amplified output voltage, or produces a signal having a "Hi" level for a time period during which the triangular wave becomes lower than this amplified output voltage. Thus, the PWM circuit 14 produces a drive pulse signal used to drive the switching device 4.

It should be understood that since the switching device 4 is constructed of a PNP transistor, this switching device 4 is turned on when a low level signal "Lo" is outputted from the PWM circuit 14, whereas this switching device 4 is turned off when a high level signal "Hi" is outputted from the PWM circuit 14. A driving circuit 16 amplifies the drive pulse signal outputted from the PWM circuit 14 up to a signal level by which the switching device 4 can be driven.

Also, the switching control circuit 10 has a soft starting circuit 15. The soft starting circuit 15 gives an effective operation to the PWM circuit 14 in order that the output voltage of the power converting circuit 1 may gradually rise when the input voltage is applied. That is, for instance, the soft starting circuit 15 carries up the amplified output voltage of the error amplifier 12, which is applied to the PWM circuit 14 when the input voltage is applied. The soft starting circuit 15, however, gradually lowers the amplified output voltage in connection with an elapse of time. As a result, the width (output period of "Lo" level) of the drive pulse signal from the PWM circuit 14 is narrowed when the input voltage is applied, and thereafter is gradually widened.

The soft starting circuit may operate such that the rising state of the output voltage of the power converting circuit 1 may be made gentle by gradually increasing the reference voltage produced from the reference power supply circuit 11.

It should also be noted that the value of the input voltage applied to the input terminal 8 of the power converting circuit 1 is equal to, for example, 12 V, the switching control circuit 10 produces the drive pulse signal in such a manner that the power converting circuit 1 may output a voltage (for example, 6 V) lower than the input voltage (12 V).

Furthermore, in a voltage reducing power supply circuit (series regulator circuit) 30, for instance, 5 V is set as a target output voltage Vout. Namely, in the power supply apparatus 100 in this first embodiment, the following voltage relationship may be established:

input voltage (12 V) at terminal 8>output voltage (6 V) of the power converting circuit 1>the output voltage (5 V) of the voltage reducing power supply circuit 30.

An ON/OFF circuit 60 constructed of a PNP transistor is connected in parallel to the power converting circuit 1. The input voltage applied to the input terminal of the power supply apparatus 100 is applied to the input terminal 8 of the power converting circuit 1, and also applied to the emitter terminal of the PNP transistor which constitutes the ON/OFF circuit 60. Also, the output voltage of the power converting circuit 1 is applied to one input terminal "A" of a switching circuit 20. An output voltage derived from the collector terminal of the PNP transistor of the ON/OFF circuit 60 is applied to another input terminal "B" of the switching circuit 20.

A state of the ON/OFF circuit 60 is switched between both an OFF state and a ON state in response to an output of a first detecting circuit 40. The first detecting circuit 40 is provided with a comparator 41. This comparator 41 compares the output voltage of the power converting circuit 1 with an output voltage (will be explained later) of the voltage reducing power supply circuit 30. The output voltage of the power converting circuit 1 is detected by dividing the voltage in the series resistor circuit of the switching control circuit 10. The output voltage of the voltage reducing power supply circuit 30 is detected by a series resistor circuit made of a resistor R6 and a resistor R7. In response to a comparison result of this comparator 41, the first detecting circuit 40 outputs either a signal having a "Lo" level or a signal having a "Hi" level so as to set the state of the ON/OFF circuit 60 to any one of the OFF state and the ON state.

It should also be noted that a driving circuit 42 employed in the first detecting circuit 40 amplifies a level of a signal outputted from the comparator 41 up to such a level at which the ON/OFF circuit 60 can be driven. Further, the driving circuit 42 is operated in such a manner that a level of a signal outputted from the first detecting circuit 40 is initially set to the "Lo" level when the input voltage is applied to the power supply apparatus 100, so that this "Lo" level signal sets the state of the ON/OFF circuit 60 to the OFF state.

The switching circuit 20 selects either the input voltage applied to the input terminal A and the input voltage applied to the input terminal B in response to an output signal from a second detecting circuit 50. It outputs the selected input voltage.

The second detecting circuit 50 is made substantially the same as the first detecting circuit 40. That is, a comparator 51 compares an output voltage of the power converting circuit 1 with an output voltage of the voltage reducing power supply circuit 30 so as to output either a "Lo" level signal or a "Hi" level signal in response to a large/small relationship. A driving circuit 52 is set to amplify the output signal of this comparator 51 to output the amplified signal. Further, when the input voltage is applied, the driving circuit 52 initially outputs a "Hi" level signal.

The voltage reducing power supply circuit 30 is connected to the output of the switching circuit 20. This voltage reducing power supply circuit 30 has a control transistor (PNP transistor) 33 between an input terminal 36 and an output terminal 37. A conduction condition under ON state of the control transistor 33 is controlled, namely, a magnitude of a voltage between the emitter and the collector of the PNP transistor 33 is controlled in order that the output voltage of the voltage reducing power supply circuit 30 attains the target voltage (5 V). As a result, the voltage reducing power supply circuit 30 can output such a voltage that is made substantially equal to the target voltage in a stable manner.

A series resistor circuit constructed of resistors R4 and R5 is provided in order that the output voltage of the voltage reducing power circuit 30 is divided. Also, a reference voltage is inputted from the reference power supply circuit 11 of the switching control circuit 10. This reference voltage is used so as to be compared with the detected output voltage which is detected by dividing the output voltage by the series resistor circuit made of the resistors R4 and R5. This reference power supply circuit 11 may be separately provided with the voltage reducing power supply circuit 30.

The voltage reducing power supply circuit 30 has an error amplifier 34. This error amplifier 34 amplifies a difference between the detected output voltage and the reference voltage. It outputs the amplified difference voltage. The amplified difference voltage of the error amplifier 34 is applied via a driving circuit 35 to the base of the control transistor 33 so as to control the conduction condition of the control transistor 33 in response to the difference between the detected output voltage and the reference voltage. The driving circuit 35 adjusts the output level of the output difference voltage from the error amplifier 34.

In addition, the voltage reducing power supply circuit 30 has an over-current detecting circuit 32 and a resistor 31 for detecting a current to avoid an over-current which flows through the control transistor 33. In the case that the current flowing through the current detecting resistor 31 exceeds a predetermined value, the over-current detecting circuit 32 causes the driving circuit 35 to increase a voltage between the emitter and the collector of the control transistor 33.

Figure 2:
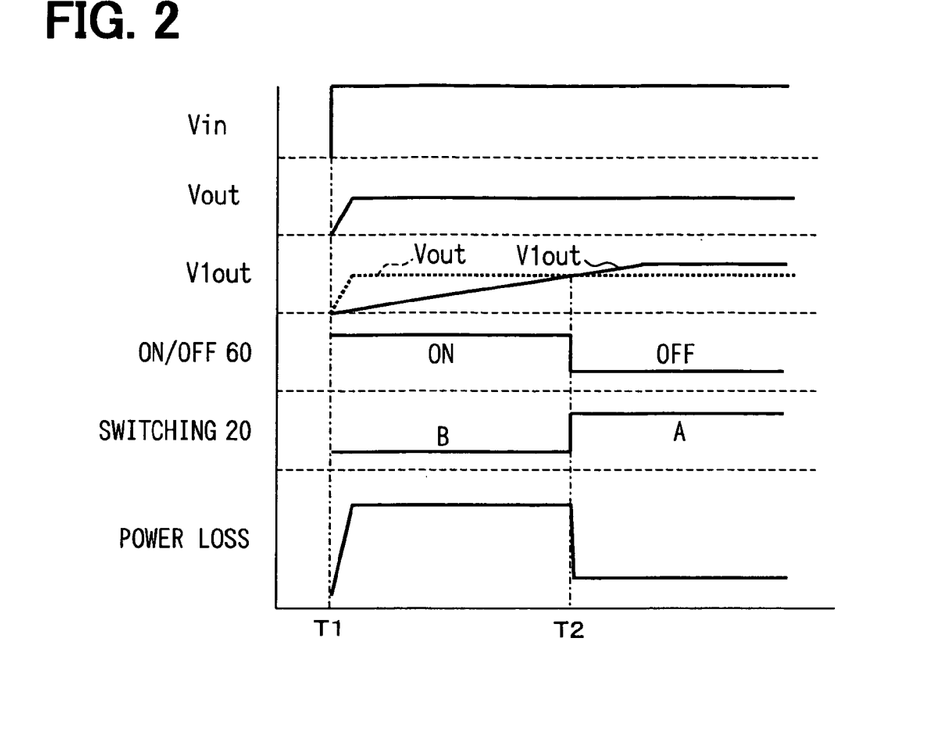
FIG. 2 is a signal diagram showing operations of the power supply apparatus according to the first embodiment of the present invention.

The power supply apparatus 100 operates as shown in FIG. 2. When an input voltage Vin is applied to the terminal 8 at a time instant T1, since a signal having a "Lo" level is initially outputted form the driving circuit 42, the ON/OFF circuit 60 is set to the ON state. Also, in the switching circuit 20, since the signal having a "Hi" level is initially outputted from the driving circuit 52, the input terminal B is selected as the input terminal which is connected to the output terminal. Then, the voltage Vin which is applied to this input terminal B is outputted from the output terminal of the switching circuit 20.

As a result, the input voltage Vin of the power supply apparatus 100 is directly applied to the input terminal 36 of the voltage reducing power supply circuit 30 just after this input voltage Vin is inputted. Thus, the voltage reducing power supply circuit 30 can quickly raise an output voltage Vout. It should also be noted that in this case, since the difference between the input voltage Vin and the output voltage Vout is large, a power loss occurring in the voltage reducing power supply circuit 30 increases.

As indicated in FIG. 2, the output voltage V1 out of the power converting circuit 1 is gradually increased from the time instant T1 due to the operations of the soft starting circuit 15 and the like. Until this output voltage V1 out exceeds the output voltage Vout of the voltage reducing power supply circuit 30, the first detecting circuit 40 continuously outputs the signal having a "Lo" level so as to maintain the ON state of the ON/OFF circuit 60.

Then, at a time instant T2, when the output voltage V1out of the power converting circuit 1 reaches the output voltage Vout of the voltage reducing power supply circuit 30, a signal having a "Hi" level is outputted from the comparator 41 of the first detecting circuit 40. The state of the ON/OFF circuit 60 is switched from the ON state to the OFF state. As a result, the application of the input voltage Vin to the input terminal B is stopped.

At the same time, since a signal having a "Lo" level is outputted from the comparator 51 of the second detecting circuit 50, the switching circuit 20 switches the connection of the input terminal 36 from the input terminal B to the input terminal A.

As a consequence, after the time instant T2, the output voltage V1 out of the power converting circuit 1 is applied to the input terminal 36 of the voltage reducing power supply circuit 30. The power converting circuit 1 produces the output voltage V1out which is lower than the input voltage Vin by turning on and off the switching device 4. Accordingly, a power loss occurring in the power converting circuit 1 is very small. Furthermore, since a difference between the voltage V1 out applied to the input terminal 36 and the output voltage Vout becomes small after the time instant T2, a power loss occurring in the voltage reducing power supply circuit 30 is also largely lowered.

As a consequence, as represented in FIG. 2, a total power loss occurring the power supply apparatus 100 becomes relatively large from the time instant T1 up to the time instant T2. However, after the time instant T2, this total power loss is largely reduced. It should also be noted that since the actual time duration defined from the time instant T1 up to the time instant T2 is very short, the increase in the power loss can be suppressed to a minimum.

Moreover, since the output voltage V1out of the power converting circuit 100 is applied to the voltage reducing power supply circuit 30, even when noise is superimposed on this output voltage V1out, the noise may be suppressed by the voltage reducing power supply circuit 30. As a result, the power supply apparatus 100 can continuously apply the stable output voltage from the output terminal 37 thereof. While the power loss is reduced and the noise is suppressed, the rapid rising operation of the output voltage can be realized.

In the first embodiment, both the first detecting circuit 40 and the ON/OFF circuit 60 are provided so that, in the case that the output voltage V1out of the power converting circuit 1 exceeds the output voltage Vout of the voltage reducing power supply circuit 30, the supply of the input voltage Vin is interrupted by the ON/OFF circuit 60. In accordance with this arrangement, after the input voltage to the voltage reducing power supply circuit 30 is switched to the output voltage V1out of the power converting circuit 1, the supply of the input voltage Vin to the voltage reducing power supply circuit 30 can be surely avoided.

However, when the output voltage V1out of the power converting circuit 9 exceeds the output voltage Vout of the voltage reducing power supply circuit 30, the connection with the input terminal B is interrupted by the switching circuit 20. As a result, both the first detecting circuit 40 and the ON/OFF circuit 60 may be omitted. In this alternative case, the switching circuit 20 may be arranged by, for instance, one pair of power transistors which are operated in an inverting operation.

Also, in the first embodiment, both the first detecting circuit 40 and the second detecting circuit 50 determine the rising operation of the output voltage V1out of the power converting circuit 1 by comparing the output voltage V1out of the power converting circuit 1 with the output voltage Vout of the voltage reducing power supply circuit 30. If the rising operation of the output voltage V1out of the power converting circuit 1 is determined while the output voltage Vout is employed as the reference which is actually outputted from the voltage reducing power supply circuit 30 when the input voltage Vin is applied, then it can surely determine that the output voltage V1out of the power converting circuit 1 has raised up to the necessary voltage, resulting in a better operation.

However, the rising operation of the output voltage V1 out of the power converting circuit 1 may be alternatively determined by comparing this output voltage V1 with a predetermined reference voltage different from the output voltage Vout of the voltage reducing power supply circuit 30.

Second Embodiment

Next, a power supply apparatus 200 according to a second embodiment will be described with reference to FIG. 3 and FIG. 4. It should be understood that the same reference numerals employed in the power supply apparatus 100 will be employed as those for denoting similar structural units of the power supply apparatus 200.

Figure 3:
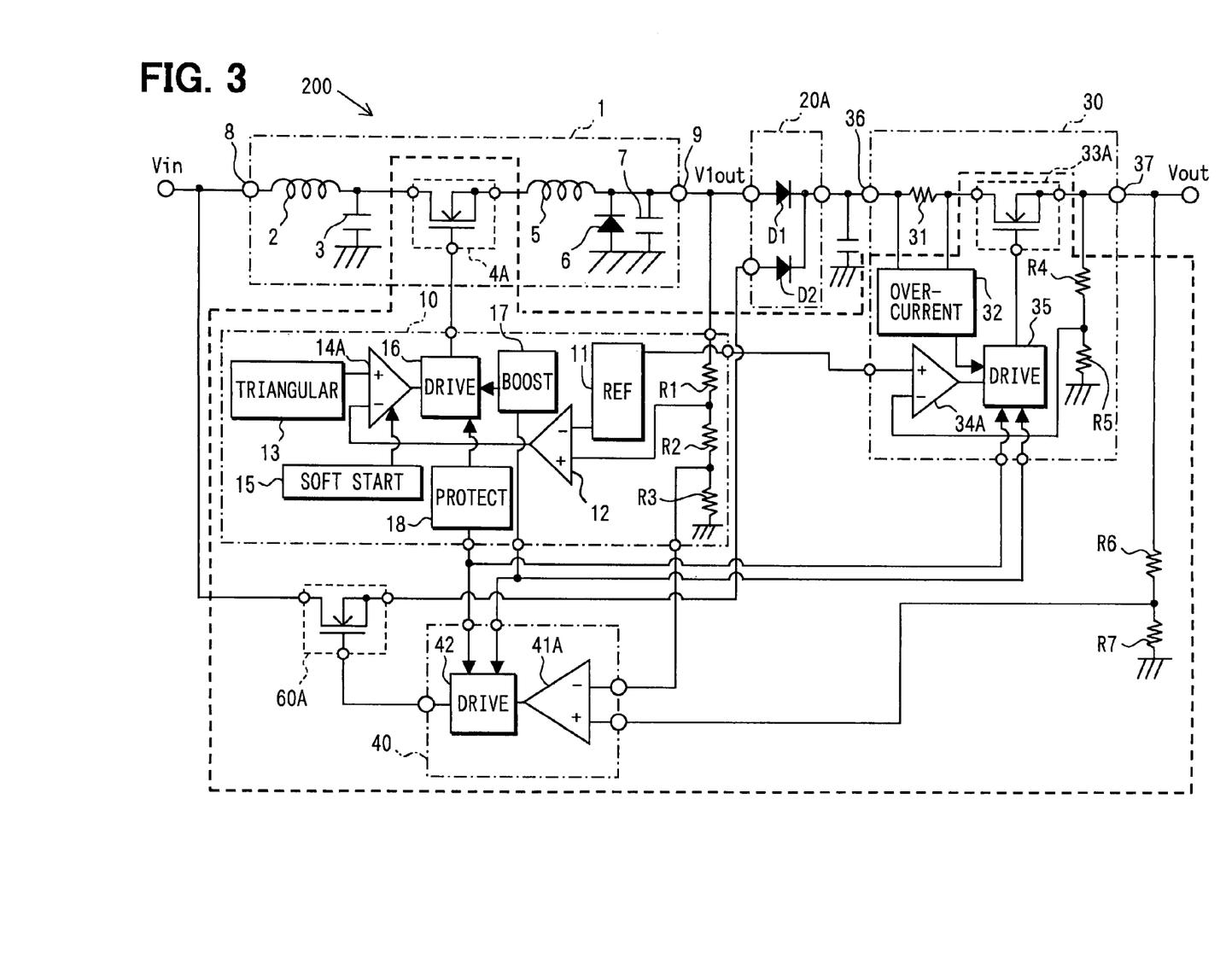
FIG. 3 is a circuit diagram showing an electric power supply apparatus according to a second embodiment of the present invention.

As shown in FIG. 3, in the power supply apparatus 200, a switching circuit 20A is constructed with diodes D1 and D2. The diode D1 is provided between the output terminal 9 of the power converting circuit 1 and the input terminal 36 of the voltage reducing power supply circuit 30. The diode D2 is provided between a collector terminal of an ON/OFF circuit 60A and the input terminal 36 of the voltage reducing power supply circuit 30.

Since both the output terminal 9 of the power converting circuit 1 and the collector terminal of the ON/OFF circuit 60A are connected via the respective diodes D1 and D2 to the input terminal 36 of the voltage reducing power supply circuit 30, a voltage applied to the voltage reducing power supply circuit 30 can be automatically switched in response to ON/OFF states of the ON/OFF circuit 60A.

Figure 4:
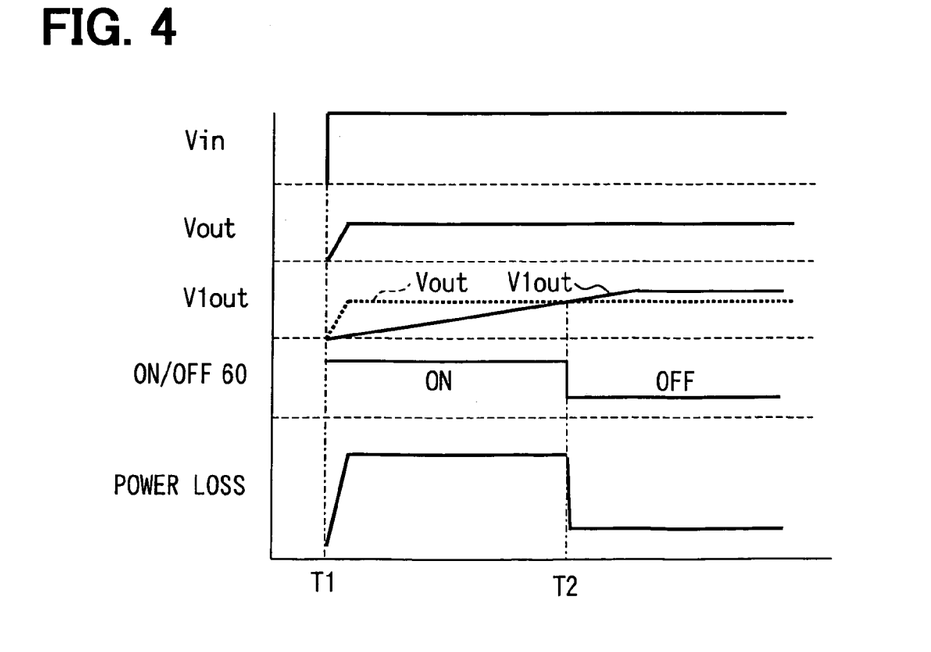
FIG. 4 is a signal diagram showing operations of the power supply apparatus according to the second embodiment of the present invention.

When an input voltage Vin is applied to the input terminal 8 of the power supply apparatus 200, the ON/OFF circuit 60A is brought into the ON state as shown in FIG. 4. The input voltage Vin is outputted from the collector terminal thereof. At this time, the output voltage V1out of the power converting circuit 1 is gradually increased. Since this output voltage V1out is lower than the input voltage Vin, the output voltage V1out is interrupted by the diode D1 and the input voltage Vin is applied via the diode D2 to the voltage reducing power supply circuit 30. As a result, the voltage reducing power supply circuit 30 can rapidly raise the output voltage Vout after the input voltage Vin is applied to the power supply apparatus 200.

Thereafter, at a time instant T2, when the output voltage V1 out of the power converting circuit 1 reaches the output voltage Vout of the voltage reducing power supply circuit 30, a large/small relationship in a comparator 41A of the first detecting circuit 40 is reversed. As a result, the comparator 41A changes the level of the output signal thereof from a "Hi" level into a "Lo" level. In response to this level change, a voltage applied to a gate terminal of a N-channel MOSFET which constitutes the ON/OFF circuit 60A is lowered, so that the ON/OFF circuit 60A is switched to the OFF state.

As a result, since the supply of the input voltage Vin from the diode D2 is stopped, the output voltage V1out of the power converting circuit 1 is automatically supplied via the diode D1 to the voltage reducing power supply circuit 30.

In accordance with the second embodiment, since the supplied voltage can be switched by operating the ON/OFF circuit 60A in conjunction with the switching circuit 20A constructed with two diodes D1 and D2, the circuit arrangement required for switching the applied voltage can be made simple.

Further, since the major circuit of this power supply apparatus 200 can be manufactured in a commonly-used semiconductor chip, a switching device 4A employed in the power converting circuit 1 is constructed with a N-channel MOSFET A control transistor 33A employed in the voltage reducing power supply circuit 30 is constructed with a N-channel MOSFET. The ON/OFF circuit 60A is constructed with a N-channel MOSFET.

It should be noted that a dotted line portion shown in FIG. 3 shows circuits which are manufactured on the commonly-used semiconductor chip. Since the major circuit of the power supply apparatus 200 is manufactured on the commonly-used semiconductor chip, the power supply apparatus 200 can be made compact and in low cost.

In FIG. 3, the control transistor 33A of the voltage reducing power supply circuit 30 is also involved in the range for being manufactured in a single semiconductor chip. Alternatively, in the case that a heat dissipation amount of this control transistor 33A is relatively large, this control transistor 33A may be excluded from being manufactured in the single semiconductor chip. In this alternative case, the control transistor 33A need not be constructed with a MOSFET, but may be formed by a bipolar transistor or the like.

In this second embodiment, both the switching device 4A and the ON/OFF circuit 60A are constructed with N-channel MOSFETs, which are different from the PNP transistors of the first embodiment. As a result, when a "Hi" level signal is supplied to the gate terminal of this N-channel MOSFET, the N-channel MOSFET is turned on. When a "Lo" level signal is supplied to the gate terminal of this N-channel MOSFET, it is turned off. As a consequence, the relationship between an inverting input and a non-inverting input in a PWM circuit 14A and a comparator 41A is reversed, as compared with that of the first embodiment.

Also, in this second embodiment, since the N-channel MOSFETs are employed in the switching device 4A and the ON/OFF circuit 60A, a sufficiently higher voltage with respect to a source potential must be applied to a gate of this N-channel MOSFET to firmly turn on this MOSFET. To this end, a boosting circuit 17 is provided in the switching control circuit 10, so that a driving voltage which is boosted up to approximately 20 V may be applied to the gate of the N-channel MOSFET.

In addition, an overheat protecting circuit 18 is provided in the switching control circuit 10. That is, in the case that the major circuit of the power supply apparatus 100 is formed in the commonly-used semiconductor chip, it is supposed that a heat generation degree thereof is also increased. Thus, an overheat protecting circuit 18 is employed. The overheat protecting circuit 18 owns a temperature sensor element.

When the overheat protecting circuit 18 detects that the temperature is increased higher than or equal to a predetermined temperature, the overheat protecting circuit 18 outputs an operation stopping signal to the respective driving circuits 16, 35, and 42. Since the major circuit of the power supply apparatus 200 is formed on the commonly-used semiconductor chip, the overheat conditions of the respective circuits by the heat generations can be sensed by a commonly-used temperature sensor element. As a result, the overheat protections of the respective circuits can be effectively carried out.

Third Embodiment

Figure 5:
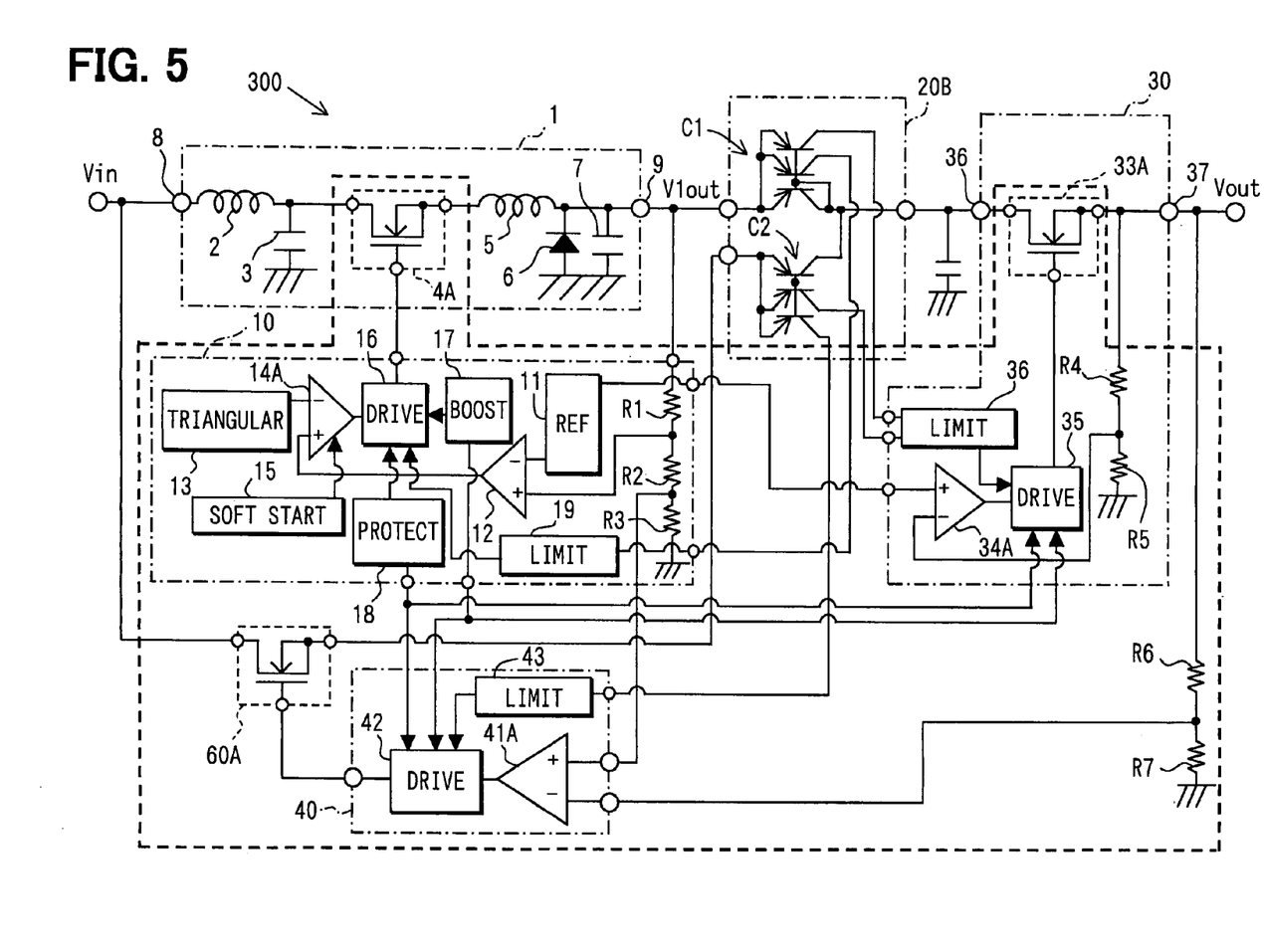
FIG. 5 is a circuit diagram showing an electric power supply apparatus according to a third embodiment of the present invention.

A power supply apparatus 300 according to a third embodiment is shown in FIG. 5. It should be understood that the same reference numerals employed in the power supply apparatuses 100 and 200 will be employed as those for denoting similar structural units of the power supply apparatus 300.

In a switching circuit 20B of the power supply apparatus 300, current mirror circuits C1 and C2 are provided. In each current mirror circuit, three PNP transistors are connected in the form of diodes respectively.

Since the current mirror circuits C1 and C2 as diodes are provided in the respective voltage applying lines from the power converting circuit 1 and the ON/OFF circuit 60A, values of currents which flow through the respective voltage applying lines can be monitored, while the switching function of the applied voltages can be realized.

The current value monitored by the current mirror circuit C1 which is provided in the voltage applying line of the power converting circuit 1 is applied to both a limiter circuit 19 of the switching control circuit 10 and a limiter circuit 36 of the voltage reducing power supply circuit 30. In the respective limiter circuits 19 and 36, a determination is made as to whether or not an over-current flows by comparing the applied current value with each of upper limit current values.

In the case that the respective limiter circuits 19 and 36 determine that an over-current flows, the respective limiter circuits 19 and 36 output operation stopping signals to the respective driving circuits 16 and 35 so as to turn on and off the switching device 4A, or to stop the control operation of the conduction condition of the control transistor 33A. As a result, both the power converting circuit 1 and the voltage reducing power supply circuit 30 can be protected from over-currents. Alternatively, the drive signal may be controlled in such a manner that the output voltage is lowered without completely stopping the operation.

The current value monitored by the current mirror circuit C2 which is provided in the voltage applying line of the ON/OFF circuit 60A is applied to both a limiter circuit 43 of the first detecting circuit 40 and the limiter circuit 36 of the voltage reducing power supply circuit 30. Similar to the above operation, in the respective limiter circuits 43 and 36, a determination is made as to whether or not an over-current flows by comparing the applied current value with each of upper limit current values.

In the case that the respective limiter circuits 43 and 36 determine the flow of the over-currents, the respective limiter circuits 43 and 36 output operation stopping signals to the respective driving circuits 42 and 35 so as to bring the ON/OFF circuit 60A to the OFF state, or to stop the control operation of the conducting condition of the control transistor 33A. As a result, both the ON/OFF circuit 60A and the voltage reducing power supply circuit 30 can be protected from the over-currents.

Since the switching circuit 20B is formed with the current mirror circuits C1 and C2, both the voltage switching function and the current value monitoring function can be realized at the same time. The current mirror circuits C1 and C2 are constructed with a plurality of PNP transistors which are connected in the diode form.

The above embodiments may be modified in various ways.

For instance, the switching devices, the control transistors, and the ON/OFF circuits may be alternatively formed by employing other sorts of transistors, for instance, NPN transistors and P-channel MOSFET transistors.

Also, the power converting circuit 1 and the voltage reducing power supply circuit 30 exemplified as the switching power supply circuit may be replaced with any sorts of circuit arrangements as long as functions thereof may be realized as a switching regulator and a series regulator.

What is claimed is:

1. A power supply apparatus comprising:
   a switching power supply circuit, provided with a switching device in a path defined from an input terminal to an output terminal, for turning on and off the switching device to convert an input voltage applied to the input terminal into an output voltage which is lower than the input voltage, and for outputting the output voltage from the output terminal;

a voltage reducing power supply circuit, provided with a control transistor in a path defined from an input terminal to an output terminal, for adjusting a conduction condition of the control transistor under an ON state to reduce an input voltage applied to the input terminal to a target output voltage, and for outputting the target output voltage from the output terminal; and a switching circuit for selectively applying any one of the input voltage applied to the input terminal of the switching power supply circuit and the output voltage outputted from the output terminal of the switching power supply circuit to the input terminal of the voltage reducing power supply circuit, wherein the switching circuit applies the input voltage applied to the switching power supply circuit to the voltage reducing power supply circuit when the supply of the input voltage to the switching power supply circuit is commenced, and thereafter switches the input voltage applied to the voltage reducing power supply circuit to the output voltage outputted from the switching power supply circuit when a predetermined condition is established.

2. A power supply apparatus as claimed in claim 1, further comprising:

an ON/OFF circuit provided in a path for conducting the input voltage of the switching power supply circuit to the input terminal of the voltage reducing power supply circuit, and for switching ON/OFF conditions of the path.

3. A power supply apparatus as claimed in claim 1, further comprising:

an ON/OFF circuit connected between the input terminal of the switching power supply circuit and the switching circuit; and a drive control circuit provided for driving the ON/OFF circuit to an OFF state in a case that the predetermined condition is established, wherein the switching circuit includes a first diode provided between the output terminal of the switching power supply circuit and the input terminal of the voltage reducing power supply circuit, and a second diode provided in a path for conducting the input voltage of the switching power supply circuit to the input terminal of the voltage reducing power supply circuit through the ON/OFF circuit.

4. A power supply apparatus as claimed in claim 3, further comprising:

a first current detecting circuit for detecting a value of a current which flows through the first diode;

a second current detecting circuit for detecting a value of a current which flows through the second diode;

a first over-current protecting circuit for stopping the operation of the switching power supply circuit in a case that the current value detected by the first current detecting circuit exceeds a predetermined first reference current value; and a second over-current protecting circuit for driving the ON/OFF circuit to the OFF condition in a case that the current value detected by the second current detecting circuit exceeds a predetermined second reference current value.

5. A power supply apparatus as claimed in claim 4, further comprising:

a third over-current protecting circuit for stopping the operation of the voltage reducing power supply circuit in a case that an over-current is detected by at least one of the first current detecting circuit and the second current detecting circuit.

6. A power supply apparatus as claimed in claim 4, wherein both the first diode and the first current detecting circuit, and both the second diode and the second current detecting circuit are formed by a current mirror circuit in which a plurality of transistors are connected in a diode form.

7. A power supply apparatus as claimed in claim 1, wherein the predetermined condition indicates that the output voltage of the switching power supply circuit exceeds a predetermined reference voltage.

8. A power supply apparatus as claimed in claim 7, wherein the predetermined reference voltage is set to the output voltage of the voltage reducing power supply circuit.

9. A power supply apparatus as claimed in claim 1, wherein at least a part of the switching power supply circuit, the voltage reducing power supply circuit and the switching circuit is manufactured on a common semiconductor chip.

10. A power supply apparatus as claimed in claim 9, further comprising:

an overheat protecting circuit containing a temperature sensor element formed on the semiconductor chip, and outputting an operation stopping signal to the switching power supply circuit, the voltage reducing power supply circuit and the switching circuit when an overheat condition is sensed by the temperature sensor element.

* * * * *